April 26, 1966   E. V. PAINTER ET AL   3,248,465
METHOD OF FILTER MEDIA MANUFACTURE
Original Filed June 11, 1959
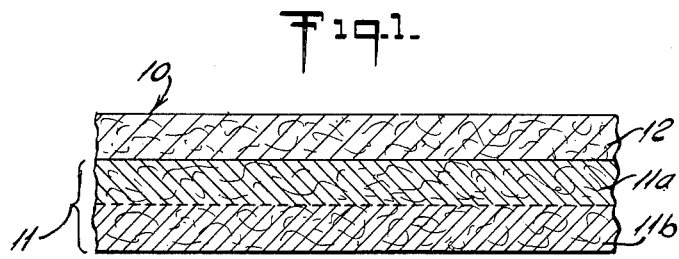
Fig. 1.
THROUGH BONDED BY
POLYVINYL ALCOHOL AND
POLYACRYLIC ACID
REACTED IN SITU
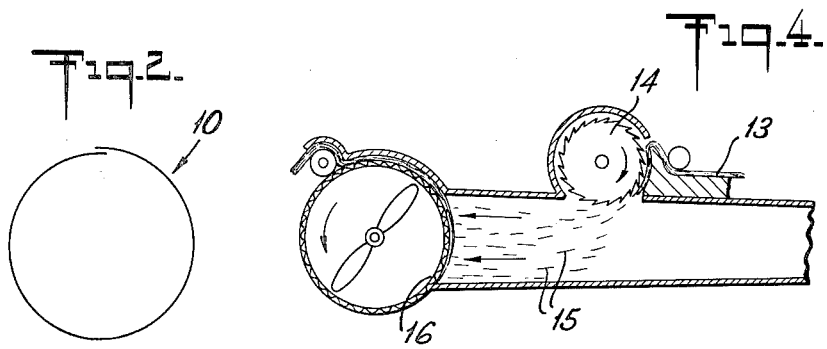
Fig. 2.
Fig. 4.
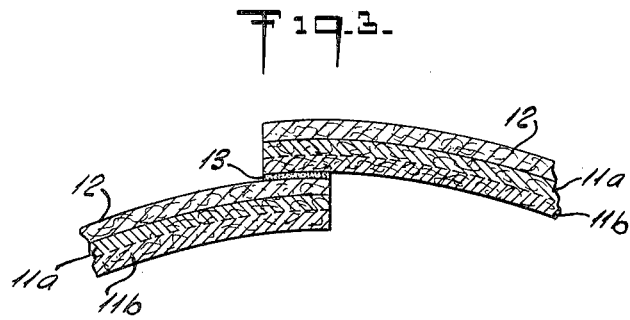
Fig. 3.
Inventors
Erle V. Painter
William R. Strickel
George L. Weir
Fred K. Mesek
BY
Olson, Mecklenburger, von Holst,
Pendleton & Neuman Attys

United States Patent Office 3,248,465
Patented Apr. 26, 1966

3,248,465
METHOD OF FILTER MEDIA MANUFACTURE
Erle V. Painter, La Grange, and William R. Strickel, Chicago, Ill., George L. Weir, Swarthmore, Del., and Fred K. Mesek, Downers Grove, Ill., assignors to Johnson & Johnson, New Brunswick, N.J., a corporation of New Jersey
Original application June 11, 1959, Ser. No. 819,757. Divided and this application Dec. 26, 1962, Ser. No. 247,408
8 Claims. (Cl. 264—113)

This application is a division of our original application, Serial No. 819,757, filed June 11, 1959, and now abandoned.

Ths invention relates to a method of manufacturing filter media, and more particularly to the method of manufacturing a boil-proof, bonded, omnidirectionally strong filter media having graded porosity. The media is formed by air depositing a heterogeneous mixture of fibers and threads and through-bonding the fibers and threads with a reaction product of polyvinyl alcohol and a polycarboxylic acid, reacted in situ.

Various filter media have been used heretofore for the separation of solid material from fluid material, e.g., for the filtration of milk. In present-day practice wherein a so-called parlor milking system is used, the milk from a number of cows is delivered to a refrigerated holding tank through a pipeline system, and it is desirable to filter the milk from each cow before it is delivered into the main pipeline. The filters for this purpose are called "in the line" filters. In such a system, the filter material must withstand considerable direct pressure differentials as well as sudden surges of reverse pressures. In addition, it must be able to withstand boiling temperatures in instances where the milking system is sanitized by very hot aqueous solutions. The art is confronted by the problem of providing economical and efficient filter media having these desirable strength properties, and also adequate filtration efficiency. In addition, the art is confronted by the problem of providing a filtration media having a white surface on which large dirt particles may be quickly or readily observed, e.g., through a transparent filter holder or unit.

The discoveries associated with the invention and relating to solution of the above problems, and the objects achieved in accordance with the invention as set forth herein include the provision of a method of making boil-proof filter media having omnidirectional strength and graded porosity which method comprises moving a web of a mixture having the following composition:

20 parts by weight of crimped rayon of about 1.6 inch staple length and about 5.5 denier (15.5 micrograms per inch actual fiber length) diameter, each fiber of which contains 6 to 15 crimps per inch (crimped basis) each crimp having an amplitude (height from mean) of about 1/32 inch and a wave length of 1/15 to 1/6 inch;

45 parts by weight of similar crimped rayon of a fineness of 8.5 micrograms per inch;

20 parts by weight of similar crimped rayon of a fineness of about 4.25 micrograms per inch;

15 parts by weight of cotton having a fineness of about 3 to 6 micrograms per inch (9.9 to 14 microns diameter average) and an average classer staple length of about 0.8 inch; and 20 parts by weight (based on the weight of the above mixture) of bleached absorbent cotton or rayon threads 0.5 to 3 inches in length, and having a cotton count of 40; into a flowing air stream substantially uniformly across its width, and stopping the movement of the fibers by a foraminous barrier while continuing the movement of the air, so as to place the heavier fibers at the bottom and the remaining fibers in successive zone thereon according to their fineness, said fibers being arranged at random in a web transverse to the predominant direction of the air flow, separating the resulting web from the air stream, impregnating said web with an aqueous solution containing polyvinyl alcohol and a polyacrylic acid and having a pH in the range of about 3.0 to 5.0, the wet pick-up of the solution being in the range of 200 to 300% and placing it in an oven at 250 to 400° F. for 2 to 4 minutes; the provision of a method wherein prior to the impregnation there is placed upon the random directional web a layer of crimped rayon of 3 to 8 denier and 6 to 15 crimps per inch, the weight of the said super-imposed layer being about 200 to 800 grains per square yard and the weight of the random directional layer being about 600 to 1200 grains per square yard; the provision of a method wherein the added layer is of 3.0 denier rayon having 9 to 12 crimps per inch, said layer weighing 400 grains/sq. yd.; the provision of a method wherein the weight of the random directional layer is 900 grains/sq. yd.; the provision of boil-proof non-woven filter media composed of cellulosic fibers bonded by the reaction product of polyvinyl alcohol and a polycarboxylic acid of at least 90,000 molecular weight in situ, the percentage of binder on a dry solids basis being in the range of 1.25 to 10.6, said fabric having a minimum tensile strength after immersion in boiling water for 20 minutes of at least 0.2 lb./in., the proportion of the alcohol being in the range of 1 to 3 parts per part by weight of the polycarboxylic acid; the provision of such material having omnidirectional strength and a boiled test strength of at least 1.0 lb./in. width; the provision of such material having graded porosity; the provision of such material having a relatively coarse incoming filtering layer followed by a relatively fine filter layer, said incoming layer being relatively smooth and white so as to provide an inspection surface; the provision of such material wherein the incoming layer is carded crimped rayon of 3 to 8 denier having 6 to 15 crimps per inch; the provision of such material wherein the incoming layer is followed by a graded pore zone of the following composition;

20 parts by weight of crimped rayon of about 1.6 inch staple length and about 5.5 denier (15.5 micrograms per inch actual fiber length) diameter, each fiber of which contains 6 to 15 crimps per inch (crimped basis) each crimp having an amplitude (height from mean) of about 1/32 inch and a wave length of 1/15 to 1/6 inch;

45 parts by weight of similar crimped rayon of a fineness of 8.5 micrograms per inch;

20 parts by weight of similar crimped rayon of a fineness of about 4.25 micrograms per inch;

15 parts by weight of cotton having a fineness of about 3 to 6 micrograms per inch (9.9 to 14 microns diameter average) and an average classer staple length of about 0.8 inch; and 20 parts by weight (based on the weight of the above mixture) of bleached absorbent cotton or rayon threads 0.5 to 3 inches in length, and having a cotton count of 40; the provision of such material being in the shape of a tube formed by rolling and partially overlapping a sheet, said overlap being bonded by a boil-proof polyethenyl adhesive, and other objects which will be apparent as details or embodiments of the invention are described hereinafter.

In connection with this disclosure, reference will be made to the accompanying drawing wherein FIG. 1 is a schematic cross-sectional view of a filter medium made in accordance with the invention. FIG. 2 is a schematic end view of such material rolled up to form a tube with an overlap seam. FIG. 3 is a schematic enlarged cross-sectional view of the overlap of such a tube, showing an adhesive inter-layer, and FIGURE 4 is a schematic cross-sectional view of apparatus illustrating the formation of a fiber web of graded porosity. In more detail in these figures, 10 indicates the media generally, 11 indicates a bottom layer made up of coarser zone 11b and a finer zone 11a, and 12 indicates a carded or isotropic layer which is coarser than zone 11a and 13 indicates a heat-sealable adhesive such as polyethylene. In order to facilitate a clear understanding of the invention, the following preferred specific embodiments are described in detail.

EXAMPLE 1a

A composite filter sheet is made up in the following manner.

A mixture or carded web of the following composition is used in the first step:

20 parts by weight of crimped rayon of about 1.6 inch staple length and about 5.5 denier (15.5 micrograms per inch actual fiber length) diameter, each fiber of which contains 6 to 15 crimps per inch (crimped basis) each crimp having an amplitude (height from mean) of about 1/32 inch and a wave length of 1/15 to 1/6 inch;

45 parts by weight of similar crimped rayon of a fineness of 8.5 micrograms per inch;

20 parts by weight of similar crimped rayon of a fineness of about 4.25 micrograms per inch;

15 parts by weight of cotton having a fineness of about 3 to 6 micrograms per inch (9.9 to 14 microns diameter average) and an average classer staple length of about 0.8 inch; and 20 parts by weight (based on the weight of the above mixture) of bleached absorbent cotton or rayon threads 0.5 to 3 inches in length, and having a cotton count of 40, which cotton count is defined as the number of yards in one pound of thread, divided by 840.

The card or web of this mixture is rapidly moved transversely into a generally horizontal flowing air stream, individual fibers or threads thereof being suspended in this stream substantially uniformly across its width, and then the movement of the fibers is stopped by a foraminous barrier while continuing the movement of the air, so as to place the fibers at random in a web arranged transverse to the predominant direction of the air flow, and the resulting web is separated from the air stream. Suitable apparatus for this operation is described in U.S. Patents 2,676,363 and 2,676,364.

In this operation, the card web 13 is fed into the apparatus as illustrated in FIGURE 4, FIGURE 4 illustrating apparatus similar, for example, to that described and illustrated in U.S. Patent No. 2,676,364. The card web is broken up by the licker-in 14 which rotates in the direction to drive the fragments or fibers 15 in a downwardly direction. The fibers or fragments are carried generally horizontally by the air flow to the foraminous barrier 16 which is in the form of a cylinder rotating so that the surface contacted by the fibers is moving in an upwardly direction. The heavier or larger fibers, threads or fragments tend to go into the lower region or zone of the moving air stream, and thus are the first to be deposited on the foraminous barrier. The less coarse or heavy fibers remain in a zone which is above the above-mentioned zone and thus are deposited just above the above-mentioned layer. In this way, there is built up a composite on the foraminous barrier having a gradient of fiber thickness, or alternatively, of porosity.

There is superimposed upon the above-described web a carded web of 3.0 denier crimped rayon of the above-described type. In one modification, the upper carded web weighs 400 grains per square yard and the lower web weighs 900 grains per square yard.

A bath is prepared containing 1.18% by weight of polyvinyl alcohol (Elvanol 72–60, i.e., high viscosity, substantially 100% hydrolyzed) and 1.18% of cross-linked polyacrylic acid (prepared from acrylic acid monomer, a small proportion of allyl sucrose, potassium persulfate catalyst and water in accordance with Example 2 of U.S. Patent 2,798,053; or Carbopol 934 polycarboxylic acid) in water. The pH of the bath is adjusted to about 3.3 by adding phosphoric acid (e.g., 0.0121% of 85% strength phosphoric acid). The above-described composite sheet is passed through the bath at about 110° F. and squeezed to remove excess solution and leave a pick-up of 250% of the solution based on fabric weight. The resulting impregnated sheet material is dried for 210 seconds in an oven at 300° F.

The composite web is passed in a continuous manner through a bonding unit and then through a drier. The drying or setting is at a temperature of about 250 to 400° F.

Samples prepared in accordance with this procedure, when submerged in boiling water for 20 minutes, give wet tensile strength tests of 4.0 lbs./in. width in the major fiber direction (i.e., for a carded material) and 1.7 lbs./in. in the cross direction, for a material weighing 3.0 oz./yd.

A sample made in accordance with the above procedure, when soaked for ½ hour in boiling 10% caustic shows no visible degradation or swelling. Similar samples soaked in 10% hydrochloric acid at room temperature for ½ hour also show no visible degradation or swelling.

These results are indeed surprising, especially in view of the test experience with viscose bonded fabrics which lack the desired porosity. Fabrics of the above type have a low load density range of 0.060–0.150 grams/cc., whereas if viscose bonded, they have a low load density range of 0.19–0.28 grams/cc. which is too compact for adequate filtration. Fabrics with boil-proof properties produced with certain latices such as the vinyls and acrylics contain extractable surface active agents. Similarly, such fabrics produced from formaldehyde containing resins contain extractable material to a more pronounced degree than materials made in accordance with this invention; and, the acid and alkali resistance of the products of the present invention is superior to such fabrics.

Any desired type of polyvinyl alcohol of any convenient viscosity such as 15 to 75 centipoises (preferably 28 to 65 centipoises in 4% solution at 20° C.) may be employed in the practice of this invention. Polyvinyl alcohol is generally produced by hydrolysis of polyvinyl acetate and either completely hydrolyzed or partly hydrolyzed products may be used.

EXAMPLE 1b

The above-described product may be used in any one of various forms. In one form it is cut into disks, e.g., 4 9/16" in diameter, and used in an "in the line" filter in a parlor milking system. It gives desirable filtration and has sufficient strength to withstand both the direct flow and also the occasional reverse flow pressures. In addition, any large dirt particles present are readily observable on the white inspection surface (which is the incoming surface).

EXAMPLE 1c

In another modification, the above-described product may be cut into sheets, e.g., 6⅜" x 6⅜", rolled up into a tube with double overlap at the seam, inserted in a tube holder and used in an "in the line" filter in a parlor milking system. It gives desirable filtration and has sufficient strength to withstand both the direct flow and also the occasional reverse flow pressure. Any large dirt particles present are readily observable on the white inspection surface (which is the incoming surface).

EXAMPLE 1d

In another modification, the above-described product may be cut into sheets, e.g., 6⅜" by about 5⅛" and rolled up into a tube with about a ½" overlap, adhered at the overlap by insertion of a sheet of high density polyethylene, the overlap being heat-sealed at sufficient temperature to melt or soften the adhesive polyethylene, without scorching or otherwise harming the bonded fabric, e.g., at a temperature of 375° F. It gives desirable filtration and has sufficient strength to withstand both the direct flow and also the occasional reverse flow pressures. Any large particles present are readily observable on the white inspection surface (which is the incoming surface).

EXAMPLE 2

The above example is repeated except that the carded web is of 5.5 denier rayon and the bath contains 1.26% of the alcohol, 0.63% of the polyacrylic acid and 0.0289% of phosphoric acid (of 75% strength). Similar results are obtained.

EXAMPLE 3

The above procedure is repeated except that the bath consists of 2.36% of the polyvinyl alcohol, 0.79% of the polyacrylic acid and 0.0242% of phosphoric acid (75% strength), and the solution pick-up is about 250%. Similar results are obtained.

Thickness (from which density is calculated) is measured under a "Low Load" compacting force of 0.16 p.s.i. The maximum pore diameter is measured by the bubble point technique (Lord and Taylor, J. Text. Inst., vol. 45, No. 5 (May 1954) p. T371), while the sample is held under a compacting force of 0.053 p.s.i., 15 p.s.i. and 30 p.s.i. The wash resistance is measured in terms of the gal./min. flow rate of a stream of water from a ¼" diameter tube 2 inches away from the sample which is just able to rupture the sample.

Comparable results to the foregoing may be achieved with various modifications thereof including the following. The fibers should be at least 1 mm. in length and preferably of a convenient length to be handled by conventional machines, which give an isotropic or random arrangement of the fibers. Also, the longer fibers tend to give products having better wet-strength. Of the natural cellulosic materials, the wood pulp fibers may be in the range of about 1 to 5 mm. in length, and the usual textile fibers may be in the range of about 1 to 5 cm. or more in length. There is no fixed upper limit for the fiber length, except, of course, the size can be handled on the carding or other machine, or the size of the finished material.

The fiber fineness is conveniently expressed in terms of micrograms per linear inch, as known in the art (as determined by weighing measured lengths of fibers or by using known instruments, e.g., a commercially available instrument) the actual equivalent average diameter may be determined from this value and the density of the fiber.

Cellulosic materials are economically available in abundant supply, and are preferred for economic reasons, e.g., cotton, viscose rayon, acetate rayon, and bleached wood pulp fibers. The fiber fineness weight of the materials in the top layer may be in the range of 2.8 to 28 micrograms per inch for the crimped material on the basis of the density of cellulose and 2.8 to 28 micrograms per inch for the other fibers on such a basis; and the fibers in the upper part of the bottom layer may have a fineness weight in the range of 2.8 to 6 micrograms per inch on such a basis.

The crimps in the fibers may be rough or irregular or regular in a roughly 2-dimensional zone or in a 3-dimensional zone. The wave lengths and amplitudes thereof each may be in the range of about 0.01 to 0.33 inch. The crimped fibers should have at least three crimps or wave-loops, and this will determine the minimum length thereof.

The weight of the omnidirectional strength layer may be in the range of 600 to 1200 grains/sq. yd. and if a top layer is employed, the weight of the top layer of carded, crimped rayon may be in the range of 200 to 800 grains/sq. yd. The top or incoming layer may also have omnidirectional strength instead of being carded.

The polycarboxylic acid may be a polymer of acrylic acid or may be obtained by polymerizing acrylonitrile followed by hydrolysis; or alternatively, it may be a copolymer or a cross-linked polymer such as divinyl compound copolymerized with an acrylic material. The molecular weight thereof must be at least 90,000 (Staudinger) and may be up to about 4,000,000.

If lower molecular weight polycarboxylic acid is used the resulting product is objectionable because of water extractable material. Higher molecular polycarboxylic acid is objectionable due to higher solution viscosity which is more difficult to handle and results in loss of desired porosity characteristics in the non-woven fabric.

The impregnating bath may contain other ingredients than the polyvinyl alcohol and the polyacrylic acid, such as corn starch, polyvinyl acetate, glycerine, or hydroxyethylcellulose.

The pH of the impregnating bath may be adjusted so that it is in the range of 3.0 to 5.0. The pH may be adjusted, if too high, by the addition of phosphoric acid, lactic acid, acetic, citric, glycollic, mineral acids and the like or hydroxide or the like alkaline agent if too low.

The drying or setting temperatures for the impregnation may be in the range of 250 to 400° F., and the times may be in the range of 2 to 4 minutes.

The amount of binder in the non-woven fabric on a dry solids basis relative to the dry weight of the fabric alone may be in the range of 1.25 to 10.6%. Lower amounts do not provide boil-proof bonding. Higher amounts might be used, if the higher viscosity thereof is not objectionable, but they are indicated for economic reasons.

The amount of the polyvinyl alcohol is in the range of 1 to 10 parts per part by weight of the polycarboxylic acid.

If too low a proportion of polyvinyl alcohol is used, the solution viscosity is undesirably high and sufficient solids concentration cannot be obtained to give a boil-proof fabric. If too high a proportion of polyvinyl alcohol is used, the final product does not have the desired boil-proof properties even at very high binder add-on.

The adhesive layer used in forming a tube or possibly a bag (tube with one end closed by a single adhesive seam or by double folding the end and interlining the folds with adhesive) may be a polyethenyl, polyethylene, or polypropylene or blends thereof having a softening point above about 110° C. Another seam adhesive is polyvinyl acetate copolymer with small proportion of either dibutyl maleate or dibutyl fumarate, as well as a very small amount of acrylic ester if desired. Another seam adhesive is the alcohol polycarboxylic acid of Example 1, but with a thickener such as methyl cellulose in an amount to provide a viscosity of about 20,000 to 50,000 centipoise (as measured on a Brookfield viscometer, Model LVF with a No. 4 spindle at 6 r.p.m.).

Another seam adhesive is a polyvinyl chloride plastisol such as sold commercially under the name of Bakelite QYNV suspended in acetyltributyl citrate in the proportion range of 1.0 to 1.5 parts of polyvinyl chloride to 1 heat such that the plastisol reaches a temperature of 250 part of the citrate. The seam must be solidified with to 350° F., which then results in a boil-proof seam. Other polyvinyl chlorides or polyvinyl chloride/acetate copolymers and plasticizers having equivalent properties may be used.

Instead of the blend of fibers set forth in Example 1, other blends of fibers in the fineness range of 2.0 to 25.0 micrograms per inch may be used. The proportions of different fineness fibers should be adjusted to give an average fiber fineness of 6.0 to 12.0 micrograms per inch.

In view of the foregoing disclosures, variations or modifications thereof will be apparent, and it is intended

We claim:

1. A method of making filter media having omnidirectional strength and graded porosity which method comprises assembling a relatively uniform, homogeneous web of fibers including fibers of a plurality of weights and sizes, removing fibers from the edge of said web and forceably throwing said fibers across the path of a rapidly moving air stream having a substantially uniform initial flow, the fibers being distributed across said air stream according to their weight and size through the initial throwing force with the lighter fibers traveling the shortest distance across the said air stream and the heavier fibers traveling the greatest distance across said air stream and said fibers being carried generally horizontally by said air stream while being separated by said initial throwing force, and moving a barrier adjacent said air stream and in the paths of said fibers whereby said fibers are deposited thereon, said fibers being deposited sequentially in accordance with the weight and size thereof whereby the web on said barrier has a graded porosity.

2. The method of claim 1 wherein said graded web is separated from the air stream and impregnated with a bonding agent.

3. The method of claim 2 wherein said impregnated web is heated to set said bonding agent in said web.

4. The method of claim 1 wherein the graded web is separated from the air stream, impregnated with an aqueous solution containing polyvinyl alcohol and a polyacrylic acid and having a pH in the range of about 3 to 5, the wet pick-up of the solution being in the range of 200 to 300 percent, and heating said web at 250 to 400° F. for a period of two to four minutes.

5. The method of claim 1 wherein said barrier is a foraminous barrier and is moved through said air stream.

6. The method of claim 5 wherein said fibers are thrown downwardly across said air stream and said foraminous barrier is moved upwardly through said air stream whereby the heavier and larger fibers are deposited on said foraminous barrier first, and lighter and smaller fibers are superimposed upon said barrier and said heavier and larger fibers, and the resulting graded web is separated from the air stream and impregnated with a bonding agent.

7. The method of claim 6 in which threads are included in said homogeneous web of fibers said threads being larger and heavier than said fibers so that said threads are disposed in a random manner on one surface of said web and comprise a supporting layer.

8. A method of making boil-proof filter media having omnidirectional strength and graded porosity which method comprises forming a web of a mixture of fibers having the following composition:

20 parts by weight of crimped rayon of about 1.6 inch staple length and about 5.5 denier (15.5 micrograms per inch actual fiber length) diameter, each fiber of which contains 6 to 15 crimps per inch (crimped basis) each crimp having an amplitude (height from mean) of about $\frac{1}{32}$ inch and a wave length of $\frac{1}{15}$ to $\frac{1}{6}$ inch;

45 parts by weight of similar crimped rayon of a fineness of 8.5 micrograms per inch;

20 parts by weight of similar crimped rayon of a fineness of about 4.25 micrograms per inch;

15 parts by weight of cotton having a fineness of about 3 to 6 micrograms per inch (9.9 to 14 microns diameter average) and an average classer staple length of about 0.8 inch; and 20 parts by weight (based on the weight of the above mixture) of bleached absorbent cotton or rayon threads 0.5 to 3 inches in length, and having a cotton count of 40;

removing fibers from the edge of said web and forceably throwing said fibers across the path of a rapidly moving air stream having a substantially uniform initial flow, the fibers being distributed across said air stream according to their weight and size through the initial throwing force with the lighter fibers traveling the shortest distance across said air stream and the heavier fibers traveling the greatest distance across said air stream and said fibers being carried generally horizontally by said air stream while being separated by said initial throwing force, moving a foraminous barrier across said air stream while continuing the movement of the air whereby said foraminous barrier stops the movement of the fibers and said fibers are deposited thereon in successive zones according to their weights and sizes, separating the resulting web from the air stream, impregnating said web with an aqueous solution containing polyvinyl alcohol and a polyacrylic acid and having a pH in the range of about 3 to 5, the wet pick-up of the solution being 200 to 300%, and placing it in an oven at 250 to 400° F. for 2 to 4 minutes.

References Cited by the Examiner

UNITED STATES PATENTS

| | | | |
|---|---|---|---|
| 2,624,079 | 1/1953 | Duvall | 264—113 XR |
| 2,746,895 | 5/1956 | Duvall | 264—113 |
| 2,769,741 | 11/1956 | Schwartz | 264—118 |
| 3,010,161 | 11/1961 | Duvall | 264—115 XR |
| 3,028,287 | 4/1962 | Greten | 264—121 |
| 3,073,735 | 1/1963 | Till et al. | 264—118 XR |

FOREIGN PATENTS 805,724  12/1958  Great Britain.

ALEXANDER H. BRODMERKEL, *Primary Examiner.*

EARL M. BERGERT, ROBERT F. WHITE, *Examiners.*